COMFORT CONDITIONING SYSTEM

Original Filed July 6, 1966

INVENTOR:
GERSHON MECKLER.
BY Avem + Avem
ATT'YS.

United States Patent Office

Re. 28,136
Reissued Aug. 27, 1974

28,136
COMFORT CONDITIONING SYSTEM

Gershon Meckler, Atlanta, Ga., assignor to
National Service Industries, Inc.

Original No. 3,390,720, dated July 2, 1968, Ser. No. 563,228, July 6, 1966. Application for reissue June 11, 1973, Ser. No. 368,776
Int. Cl. F25b *27/00*
U.S. Cl. 165—39 15 Claims

Matter enclosed in heavy brackets [ ] appears in the original patent but forms no part of this reissue specification; matter printed in italics indicates the additions made by reissue.

ABSTRACT OF THE DISCLOSURE

For supplying conditioned air to a room, a system having a box for mixing conditioned air with either room air or heated air from a plenum, or both. The mixing box, which is mounted flush in a dropped ceiling, has two opposed openings in its surfaces; one opening leads to the room and the other leads to the plenum. Two spaced apart faces are pivotally mounted over the openings such that at extreme positions one of the openings is covered and the other is uncovered and at intermediate positions both openings are uncovered in varying degrees. Conditioned air passes through a nozzle to increase its velocity, mixes with secondary air from the uncovered openings, and enters the room. Room temperature is regulated by a controlled motor which operates the two pivotally mounted faces.

This invention relates to a comfort conditioning system and, more particularly, to a system which is capable of providing zone control over temperature notwithstanding variations in load, and without the necessity for varying the temperature of conditioned or primary air, or the rate at which such air is supplied, and also without the necessity for providing both hot air and cold air for mixing in varying proportions as load changes.

The present invention is closely related to that disclosed and claimed in U.S. Pat. 3,193,001, being, in essence, an extension thereof.

It is an object of the invention to provide a comfort conditioning system.

It is a further object of the invention to provide such a system wherein primary conditioned air is mixed with circulated room air, is mixed with heated air from a plenum, or is mixed with a combination of room air and heated air from a plenum as required to maintain a desired temperature condition, and depending upon the thermal load at any given time.

Figure 1:
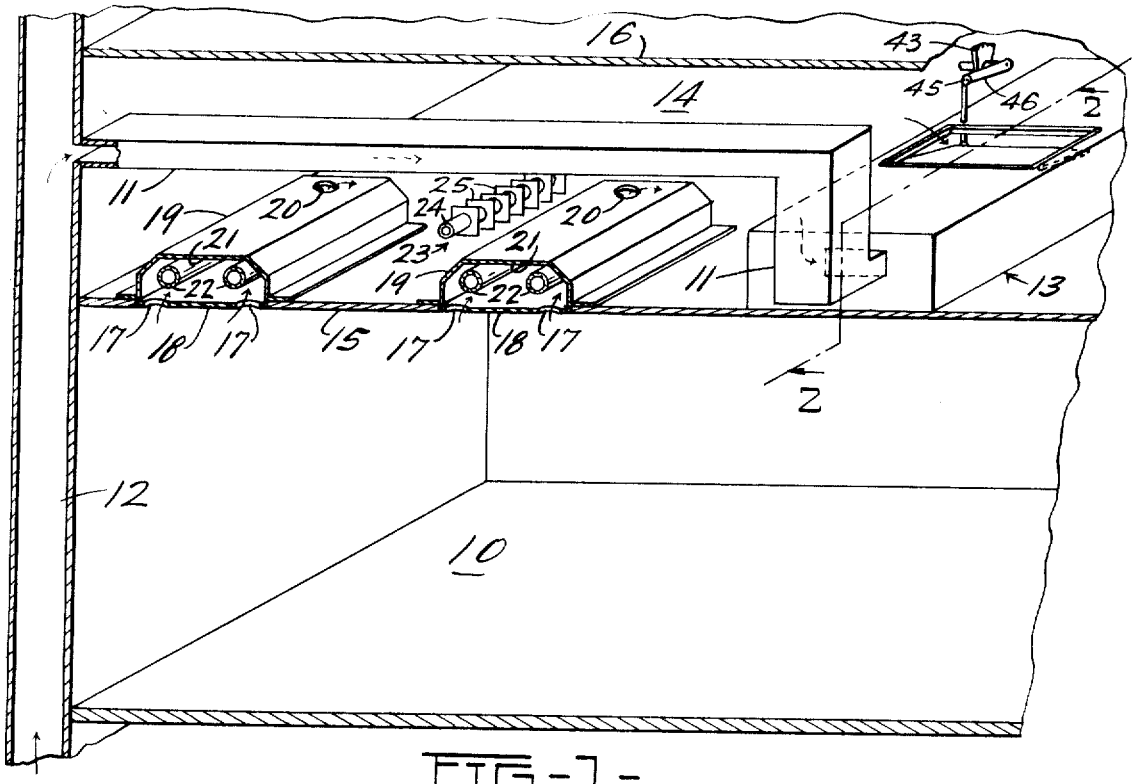
Figure 2:
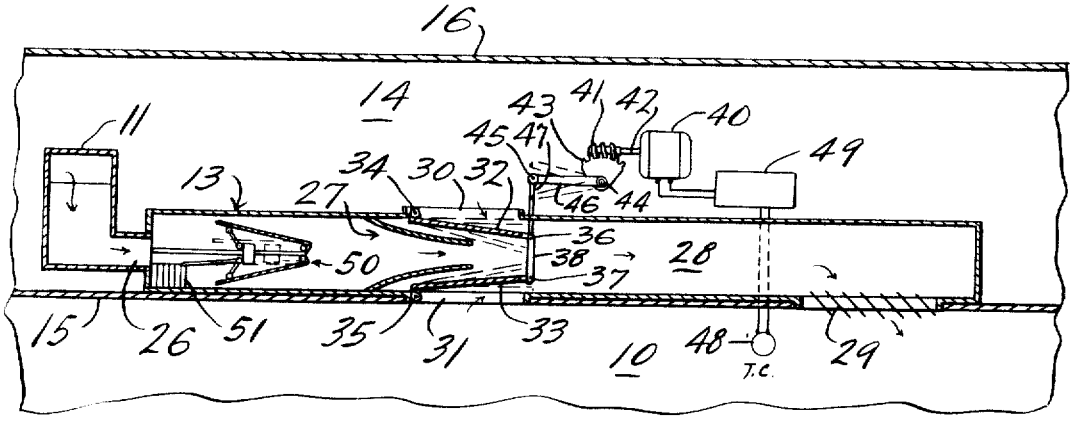

Other objects and advantages will be apparent from the description which follows, reference being made to the accompanying drawings, in which:

FIG. 1 is a partially schematic view in perspective, with parts broken away to show details, of a system according to the invention; and FIG. 2 is a vertical sectional view of a mixing box which constitutes a major portion of the system of FIG. 1.

Referring now in more detail to the drawings, and, in particular, to FIG. 1, an air conditioning system according to the invention is shown for maintaining a comfort condition in a room 10. The system includes a duct 11 through which primary or conditioned air from a rise 12 is delivered to a mixing box indicated generally at 13. The mixing box 13 is positioned within a plenum 14 between a false ceiling 15 for the room 10 and a floor 16 of a room (not illustrated) above the room 10. Air within the plenum 14 is heated, for example by circulation of air from the room 10 upwardly through openings 17 in diffuser panels 18 of lighting fixtures 19, and then upwardly through openings 20 in reflectors 21 of the lighting fixtures 19 and into the plenum 14. Air so circulated from the room 10 through the lighting fixtures 19 and into the plenum 14 is heated by the lights in the fixtures 19, which are shown as fluorescent tubes 22, so that the plenum is a source for heated air. Additionally, or alternatively, air in the plenum 14 can be heated by circulation from a source (not illustrated) for a heated heat transfer fluid through radiators, one of which is shown in FIG. 1 generally designated 23, and comprising a conduit 24 to which radiating fins 25 have been soldered or otherwise attached.

Referring now to FIG. 2, conditioned or primary air from the duct 11 enters the mixing box through an inlet 26, and flows from left to right through a nozzle 27, a mixing region 28, and then downwardly through a grill 29 into the room 10. Flow of primary air through the nozzle 27 tends to induce a flow of air both from the plenum 14 through an inlet 30 and from the room 10 through an inlet 31. Flow of air through one or both of the inlets 30 and 31 is controlled by cooperating dampers 32 and 33 which are pinned, at 34 and 35, respectively to the mixing box 13, and, at 36 and 37, respectively to a strap 38. In the positions shown in FIG. 2 for the dampers 32 and 33, air can flow both from the plenum 14 through the inlet 30 and from the room 10 through the inlet 31. This is an appropriate position for the dampers 32 and 33 when the thermal load on the room 10 is intermediate.

As shown in FIG. 2, the positions of the dampers 32 and 33 are controlled by a motor 40 which carries a worm gear 41 on its shaft 42. When the worm 41 is driven a sector 43 is rotated about a pin 44 causing the free end 45 of an arm 46 to move upwardly or downwardly, depending upon the direction of rotation of the worm 41. The limits of rotation of the arm 46 are indicated by dotted lines. The free end 45 of the arm 46 is pinned to a rod 47 which, in turn, is pinned to the damper 32, so that clockwise rotation of the arm 45 causes upward movement of the dampers 32 and 33, the limiting position being one where the dampers 32 fully closes the inlet 30. This is the damper position when maximum cooling by the primary conditioned air is desired. Counterclockwise rotation of the arm 46 moves the dampers 32 and 33 downwardly, the limiting position being one where the damper 33 fully closes the opening 31. This position is desired when minimum cooling by the conditioned primary air, or maximum reheat thereof, is needed. The motor 40 can be controlled, as shown in FIG. 2, by a thermocouple 48 which senses the dry bulb temperature in the room 10, as distinguished from the temperature of air discharged from the grill 29, and a controller 49 to position the dampers 32 and 33 at their upper limit when maximum cooling is required, at their lower limit when minimum cooling is required, or at any required intermediate position when intermediate cooling is required.

Fans driven by the impingement on their blades of primary conditioned air have been suggested (see U.S. Patent 3,209,668). Such fans, when appropriately shaped, can be used to facilitate an induced flow of secondary air, for example through the inlets 30 and 31 of the mixing box 13 and mixing of the primary and secondary air prior to discharge of the mixture through the grill 29, and are advantageously so employed.

It will be appreciated that the optimum volume of primary conditioned air, per unit of time, to be delivered to the room 10 will be dependent upon many factors, including the heat load on the room from all sources, the magnitude of the variation in heat load, e.g. that attributable to outside conditions, including ambient dry bulb temperature and solar load, as well as that attributable to occupancy of the room, and may be different at different times of the year. The mixing box 13 includes a damper 50 of the umbrella type which can be driven from the full throttle position shown in solid lines to the full open position shown in dotted lines by a bellows 51. Manual or autoamtic control of the damper 50 may be preferred in any given installation, depending upon design considerations.

It is preferable that the lighting fixtures 19 in the system according to the invention be provided with passages through which water can be circulated to absorb heat, for example from the reflectors 21, as discussed in detail in U.S. Patent 3,193,001. This enables dissipation of heat load attributable to the lights without the use of refrigerative capacity, for example by means of an evaporative cooler. In addition, when the lights are not energized, heated water from a suitable source can be circulated through the fixtures to compensate for heat losses.

The system of the invention has been described as capable of providing zone control over temperature notwithstanding variations in load, and without the necessity for varying the temperature of the conditioned or primary air, or the rate at which such air is supplied. The system is also applicable where primary air is delivered at a varying rate, for example from the riser 12. All the features of zone control are retained, and the rate at which conditioned primary air, or the temperature of such air, can be varied to compensate for general variations in demand for air conditioning, e.g. caused by seasonal changes in ambient conditions.

It will be apparent that a system according to the invention enables individual zone or room control of temperature even though only one stream of conditioned primary air is supplied, and at a substantially constant pressure. This is possible because the system utilizes what may be denominated local, controlled reheat as required. Excessively cold conditioned air cannot be used in an air conditioning system, if delivered directly to the space to be conditioned, as a condition of discomfort would be the consequence. However, in the system of the invention, primary conditioned air is always mixed (1) with room air, e.g. at about 75° F. dry bulb temperature, (2) with heated air from the plenum 14, or (3) with a mixture of room air and heated air from the plenum 14. Accordingly, the mixture of air delivered from the mixing box 13 through the grill 29 is always at a temperature appreciably higher than that of the primary conditioned air itself. This means that the conditioned primary air can be at a temperature sufficiently low that it would cause discomfort if delivered directly to the room 10 and, therefore, that a minimum flow thereof is required to perform any given air conditioning function. Accordingly, the system enables the use of risers and ducts of minimum size to carry conditioned air, and minimizing of the dead space in a building to accommodate risers as well as height, floor-to-floor, in a multi-story building.

It will be apparent that various changes and modifications can be made from the specific details set forth herein without departing from the spirit and scope of the invention as defined in the appended claims, and that, in its essential details, the invention constitutes an air conditioning system which comprises, in combination, an air supply conduit having at least one air outlet into a room, means forming a first air inlet passage from the room to the conduit, an air plenum having a plenum inlet from the room and a plenum outlet to the supply conduit, means for supplying a primary flow of conditioned air to the air supply conduit, and effective, when conditioned air is so supplied, to tend to cause a first flow of room air through the first inlet passage and a second flow of room air through the plenum inlet, the plenum, and the plenum outlet, and effective to cause mixing of the first and second flows of air with the conditioned air in the supply conduit and subsequent discharge of the mixture to the room through the air inlet, means for heating the second flow of air, and means for controlling the relative proportions of the first and second flows of air.

I claim as my invention:

1 A system for conditioning air within a room *having an overlying ceiling air plenum defined between the room ceiling and building structure spaced above the room ceiling,* said system comprising, in combination, an air supply conduit *in said ceiling air plenum and* having at least one air outlet into the room, means forming a first air inlet passage from the room *through said ceiling* to said conduit, [an] *said ceiling* air plenum having a plenum inlet from the room *through said ceiling* and a plenum outlet to said supply conduit, means for supplying a primary flow of conditioned air to said air supply conduit, and effective, when conditioned air is so supplied, to tend to cause a first flow of room air through said first inlet passage and a second flow of room air through said plenum inlet, said *ceiling air* plenum, and said plenum outlet, and effective to cause mixing of the first and second flows of air with the conditioned air in said supply conduit and subsequent discharge of the mixture to the room through said air outlet, means for heating *the air in said ceiling air plenum and thereby heating* the second flow of air, and means for controlling the relative proportions of the first and second flows of air *to control the temperature in said room.*

2. The system for conditioning air as defined in claim 1 wherein said means for heating the second flow of air includes *a light fixture in said ceiling air plenum, said light fixture providing* a source of artificial light *directed into said room* and heat *for the air in said ceiling air plenum.*

3. The system of conditioning air as defined in claim 1 wherein said means for heating the second flow of air includes a fluid conduit through which a heated fluid is circulated.

4. The system for conditioning air as defined in claim 1 wherein said means for heating the second flow of air comprises a source of artificial light and heat and a fluid conduit through which heated fluid is circulated.

5. The system for conditioning air as defined in claim 1 wherein said means for controlling the relative proportions of the first and second flows of air is responsive to the temperature within said room whereby, when said room temperature falls below a predetermined level, said control means will increase the relative proportion of said second flow and whereby, when said temperature rises above such predetermined level, said control means will increase the relative proportion of said first flow.

6. The system for conditioning air of claim 1 which further includes means for regulating the amount of the primary flow of conditioned air through said air supply conduit.

*7. The system for conditioning air as defined in Claim 1 wherein said proportions controlling means includes means for varying said first and second flows of air relative to each other and in accordance with variations of the temperature in said room.*

8. A system for conditioning air within a room *having an overlying ceiling air plenum defined between the room ceiling and building structure spaced above the room ceiling,* said system comprising, in combination, an air supply conduit *in said ceiling air plenum and* having at least one air outlet into the room, means forming a first air inlet passage from the room *through said ceiling* to said conduit, [an] *said ceiling* air plenum having a plenum inlet from the room *through said ceiling* and a plenum outlet to said supply conduit, means for supplying a primary flow of conditioned air to said air supply conduit. and effective, when conditioned air is so supplied, to tend to cause a first flow of room air through said first inlet passage and a second flow of room air through said plenum inlet, said plenum, and said plenum outlet, and effective to cause mixing of the first and second flows of air with the conditioned air in said supply conduit and subsequent discharge of the mixture to the room through said air outlet, a nozzle operable to increase the velocity of said first and second flows of air, means for regulating the amount of the primary flow of conditioned air through said air supply conduit, means for heating *the air in said ceiling air plenum and thereby heating* the second flow of air, and means for controlling the relative proportions of the first and second flows of air *to control the temperature in said room.*

*9. A system for conditioning air as defined in claim 8 wherein said proportions controlling means includes means for varying said first and second flows of air relative to each other and in accordance with variations of the temperature in said room.*

10. An air flow mixing device *for installation in a ceiling air plenum defined between the ceiling of the room to be served by said device and building structure spaced above said ceiling* comprising, in combination, a conduit for conducting a flow of primary air, and having at least a par of opposed wall surfaces *including a top wall surface and a bottom wall surface* and a pair of opposed air inlets, one in each of said opposed wall surfaces, *the inlet in said top wall surface being adapted to be in communication with said ceiling air plenum and the inlet in said bottom wall surface being adapted to be in communication with the air in said room when said device is installed,* an air outlet *in said bottom wall surface* spaced from and generally co-planar with *the* one of said air inlets *in said bottom wall surface so that with said device installed in said ceiling air plenum with said bottom wall surface immediately above said ceiling said bottom air inlet and said air outlet lie in a plane immediately above the general plane of said ceiling,* movable damper *means* [mens] positioned between said inlets, said damper means including a first face hinged to one of said opposed wall surfaces adjacent to the air inlet in said one surface, a second face spaced from said first face and hinged to the other of said opposed wall surfaces adjacent to the air inlet in said other surface, and means for pivotally moving said first and second faces to any point between a first extreme position at which said first face closes the air inlet in said one surface and said second face is spaced from the air inlet in said other surface whereby a flow of primary air between said first and second faces induces secondary air to flow from a first air space *comprising said ceiling air plenum* through the air inlet in said other surface, to mix with said primary flow and to flow through said air outlet and a second extreme at which said first face is spaced from the air inlet in said one surface and said second face closes the air inlet in said other surface whereby said primary air flow induces secondary air to flow from a second air space *comprising said room air space* through the air inlet in said one surface, to mix with said primary flow and to flow out said air outlet.

11. The air flow mixing device of claim 10 wherein said air outlet and said co-planar air inlet are disposed such that air flowing through said air outlet will not flow immediately through said co-planar air inlet.

12. The air flow mixing device of claim 10 including means within said air outlet to direct air flowing through said air outlet away from said co-planar air inlet.

13. An air flow mixing device as claimed in claim 10 which additionally includes means to increase the velocity of the secondary flow of air through the opposed air inlets in said wall surfaces.

14. An air flow mixing device as claimed in claim 13 wherein said means to increase the velocity of the secondary flow of air is a nozzle disposed between the spaced apart faces of said damper means.

15. An air flow mixing device as claimed in claim 10 which additionally includes a damper to control flow of primary air upstream of said damper means.

References Cited

The following references, cited by the Examiner, are of record in the patented file of this patent or the original patent.

UNITED STATES PATENTS

| | | | |
|---|---|---|---|
| 2,884,228 | 4/1959 | Jorgensen | 165—65 |
| 2,737,875 | 3/1956 | Kurth et al. | 98—38 |
| 3,065,686 | 11/1962 | Geocaris | 98—40 |
| 3,114,505 | 12/1963 | Kennedy | 236—13 |
| 3,165,051 | 1/1965 | Archer et al. | 98—40 |
| 3,382,916 | 5/1968 | Laux | 165—36 |
| 1,878,012 | 9/1932 | Stacey | 165—54 |
| 3,122,201 | 2/1964 | Ashley et al. | 165—26 |
| 2,076,382 | 4/1937 | Minton | 165—48 |
| 3,018,088 | 1/1962 | Allander et al. | 165—103 |
| 2,899,180 | 8/1959 | Allander et al. | 165—16 |

FOREIGN PATENTS

| | | |
|---|---|---|
| 379,430 | 9/1932 | Great Britain. |
| 1,167,507 | 1/1960 | Germany. |
| 91,644 | 3/1958 | Norway. |
| 205,477 | 1/1957 | Australia. |
| 1,154,341 | 10/1957 | France. |

MANUEL A. ANTONAKAS, Primary Examiner

D. J. O'CONNOR, Assistant Examiner

U.S. Cl. X.R.

98—38 BZ, 40 DL; 236—13.